United States Patent

[11] 3,589,814

| [72] | Inventors | Edward B. Patterson<br>Haddonfield, N.J.;<br>James L. Manniso, Philadelphia, Pa.;<br>Robert F. Dalton, Haddonfield, N.J. |
|---|---|---|
| [21] | Appl. No. | 876,212 |
| [22] | Filed | Dec. 1, 1969 |
| [45] | Patented | June 29, 1971 |
| [73] | Assignee | Arthur H. Thomas Company<br>Philadelphia, Pa.<br>Continuation of application Ser. No.<br>534,028, Mar., 1966, now abandoned. |

[54] ROTATING CELL SPECTROPHOTOMETER
2 Claims, 7 Drawing Figs.

[52] U.S. Cl. ................................................. 356/96,
250/218, 356/205, 356/179
[51] Int. Cl. ................................................. G01j 3/08,
G01j 3/42
[50] Field of Search ............................... 310/237;
356/51, 97, 205, 96

[56] References Cited
UNITED STATES PATENTS

| 467,215 | 1/1892 | White | 310/237 |
|---|---|---|---|
| 2,312,010 | 2/1943 | Van den Akker | 356/78 |
| 2,413,080 | 12/1946 | Seeley | 356/97 |
| 2,474,098 | 6/1949 | Dimmick | 356/95 |
| 2,551,833 | 5/1951 | Ewing | 356/94 |
| 2,709,943 | 6/1955 | Frommer | 356/205 |
| 2,868,060 | 1/1959 | Akerman et al. | 356/205 |
| 2,984,146 | 5/1961 | Kwart et al. | 356/51 |

Primary Examiner—Ronald L. Wibert
Assistant Examiner—F. L. Evans
Attorney—Seidel and Gonda ABSTRACT: A spectrophotometer uses a single beam of light into which the sample cell and reference cell are alternately rotated. The radiation-sensing circuit includes means to automatically compensate to read 100 percent transmission.

PATENTED JUN 29 1971

INVENTORS.
EDWARD B. PATTERSON
JAMES L. MANNISO
ROBERT J. DALTON

BY Seidel & Gonda
ATTORNEYS.

ROTATING CELL SPECTROPHOTOMETER

This is a continuation of application Ser. No. 534,028, filed Mar. 14, 1966, now abandoned.

This invention relates to a spectrophotometer. More particularly, this invention relates to a single-beam spectrophotometer having means for rotatably and alternately inserting a sample cell and reference cell in the light beam.

It is well known in the art of spectrophotometry that the most accurate and reproducible results are obtained by passing light energy from a single source through both the sample and reference cell. For this reason, it has heretofore been proposed to use optical devices such as prismatic beam splitters, mirrors or the like to divide the monochromatic electromagnetic energy prior to passing it through the sample cell and reference cell. However, such split-beam spectrophotometers suffer from several disadvantages. The mirrors or prisms used in dividing the beam and redirecting it may differ slightly in their optical properties therefore rendering the electromagnetic energy passing through the reference different from that passing through the sample. Another disadvantage of the split-beam spectrophotometer is that it requires either two photosensitive devices or one with appropriate chopping apparatus. It is improbable that two photosensitive devices would have identical electrical characteristics, especially sensitivity. If one photosensitive device is used, then the beams strike the cathode at different positions. With the beams of electromagnetic energy impinging at spaced-apart points on the cathode, there is a difference in sensitivity.

The present invention overcomes the foregoing and other deficiencies by providing a new and unobvious spectrophotometer. The spectrophotometer described herein includes a single beam of electromagnetic energy and one photocell with apparatus to rotate the sample cell and reference cell alternately in and out of the electromagnetic beam. The present invention also includes switching means for switching the photocell into the energizing circuit when the sample cell and reference cell are properly aligned with the electromagnetic beam. The present invention includes a novel circuit for adjusting the voltage applied to the dynodes of a photomultiplier to adjust for variations caused by changes in the electromagnetic beam such as when the wavelength of the light is changed during scanning of the spectrum.

Therefore it is the general object of the present invention to provide a novel spectrophotometer.

It is yet another object of the present invention to provide a novel spectrophotometer having means to rotate the sample cell and reference cell alternately into and out of an electromagnetic beam of radiation.

Another object of the present invention is to provide a control circuit for maintaining the reference output of a photomultiplier constant regardless of frequency changes in the light beam.

Yet another object of the present invention is to provide a novel switching commutator and means for rotating the cell.

It is still another object in the present invention to provide a novel rotating sample cell and reference cell spectrophotometer having a novel control circuit.

Other objects will appear hereinafter.

For the purpose of illustrating the invention, there is shown in the drawings a form which is presently preferred; it being understood, however, that this invention is not limited to the precise arrangements and instrumentalities shown.

Spectrophotometry is a method of chemical analysis based on the absorption or attenuation by matter of electromagnetic radiation of a specified wavelength or frequency. The region of electromagnetic spectrum most useful for chemical analysis is that between 2000 angstroms (A) and 300 microns ($\mu$).

By using a spectrophotometer, the intensity of the light transmitted through an absorbing substance may be compared with the light intensity when no such substance or a standard substance is in the light beam. Two fundamental laws govern the intensity of the light transmitted by an absorbing material. The first law, called the Bouguer-Lambert Law, states that $$\log(I_o/I) = Kb$$

where $I_o$ is the intensity of the light beam with no sample present, $I$ is the intensity of the light beam after passing through the sample, $K$ is a constant depending upon the sample and wavelength of the light, and $b$ is the thickness of the absorbing solution. The second law, called Beer's Law, states that $$\log(I_o/I) = K'c$$

where $I$ and $I_o$ are as above, $K'$ is a constant depending on the sample and wavelength of a light, and $c$ is the concentration of absorbing material in the sample. These two laws may be combined in the form $$\log(I_o/I) = abc$$

where $I_o$, $I$, $b$, and $c$ are as described above, and $a$ is a constant called the absorptivity or extinction coefficient.

Two other terms are commonly used in spectrophotometric analysis. These are Transmittance and Absorbance $$T = I/I_o$$
$$A = \log(1/T) = \log(I_o/I) = abc$$

The Absorbance, $A$, is directly proportional to the length of the light path through the sample, and to the concentration of the absorbing material. It is a term most used in quantitative spectrophotometric work.

The Bouguer-Lambert-Beer Law is strictly obeyed only when monochromatic radiation, that is radiation of a single wavelength or frequency, is used. For this reason, all spectrophotometers use monochromators to produce radiation which is as close to monochromatic as possible.

In most quantitative analytic work, a calibration or standard curve is prepared by measuring the absorption of known amounts of the absorbing material at the wavelength at which it strongly absorbs. The point at which a material most strongly absorbs may be determined by preparing an absorption spectrum which is a curve of the absorbance as a function of wavelength. The absorbance of a sample is read directly from the measuring circuit of a spectrophotometer. The spectrophotometer may also be used to prepare an absorption spectrum.

The apparatus of the present invention may be used either for the preparation of absorption spectra or measurements of absorbance.

Figure 2:
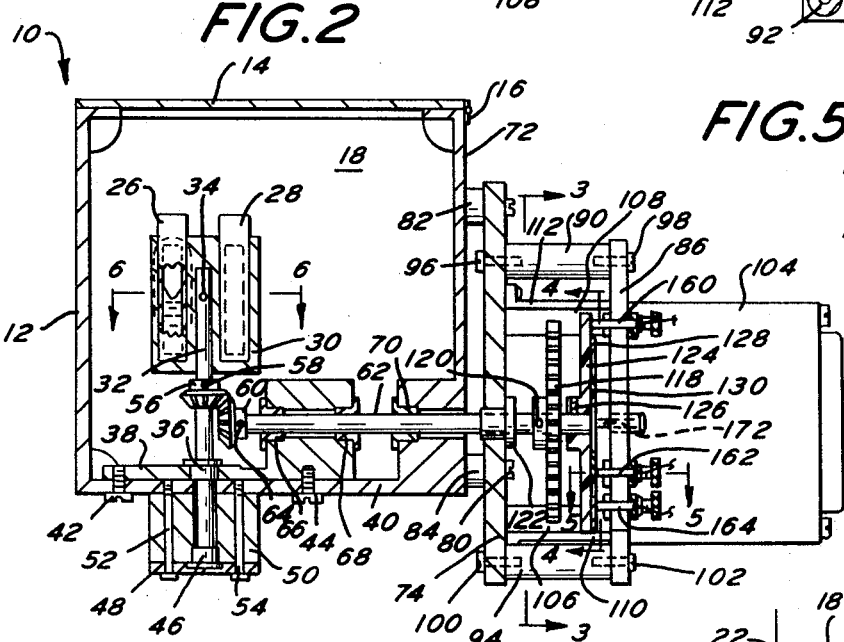
FIG. 2 is a sectional view of the apparatus illustrated in FIG. 1 taken along the line 2—2.

Referring now to the drawing in detail, wherein like numerals indicate like elements, it is shown in FIG. 2 the supporting structure and commutator for the sample and reference cells designated generally as 10.

Figure 6:
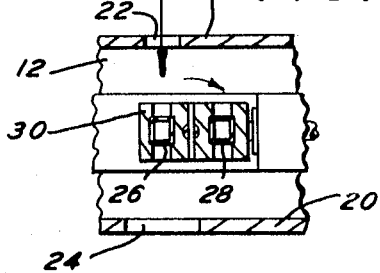
FIG. 6 is a sectional view of the cell illustrated in FIG. 2 taken along the line 6—6.

The structure includes a housing 12 having a cover 14 pivotally supported by the hinge 16. As best shown in FIG. 6, the sidewalls 18 and 20 of housing 12 are provided with apertures 22 and 24. Aperture 22 is positioned so as to permit light represented by the arrow to pass into the housing 12 and through whichever of the sample or reference cell is positioned in front of it. The light passes out of the housing 12 through the aperture 24.

As shown in FIG. 2, the reference cell 26 and sample cell 28 are supported within the housing 12 by a cell mount 30. The cell mount 30 in turn is fixed to the shaft 32 by any conventional means such as a setscrew 34. The sample and reference cell may be any conventional absorption cell. Preferably, the cells are rectangular in cross section and made of silica which has been sinterfused at high temperature. In the preferred embodiment, the absorption cells have a 10 mm. light path length, a 5 mm. inside width and a capacity of approximately 2 ml.—5 ml. The shaft 32 extends through a bearing 36 in a bearing support 38. The bearing support is retained on the bottom wall 40 of housing 12 by a pair of screws 42 and 44. The end of shaft 32 extends into end bearing 46 which is held in place by plate 48. The plate 48 is retained against the outer wall of bearing housing 50 by screws 52 and 54 threadedly engaged in bottom wall 40.

A bevel gear 56 is fixed on the shaft 32 by any conventional means such as a setscrew 58 and engages the bevel gear 60 fixed on the end of shaft 62 by a setscrew 64. The shaft 62 extends parallel to the bottom wall 40 and is supported by the bearing 66 and 68 in bearing support 38 and the bearing 70 in an extended portion of end wall 72.

A commutator and motor support plate 74 is fixed to end wall 72 by four bolts. Only bolts 76 and 78 and 80 are shown. The plate 74 is held in spaced-apart relation with the end wall 72 by means of spacers on each of the bolts, such as spacers 82 and 84 shown in FIG. 2. A commutator brush support plate 86 is mounted in spaced-apart parallel relation to the plate 74 by spacers 88, 90 and 92 and 94 through which appropriate fasteners, such as the bolts 96, 98, 100, 102 extend to engage plate 74. An electric motor 104 is mounted on the plate 74 by means of spacers 106 and 108, brackets 110 and 112, and appropriate bolts.

A pinion gear 114 is mounted on the shaft 116 of motor 104 and meshes with a pinion gear 118 fixed on shaft 62 by a setscrew 120. The shaft 62 extends through a bearing 122 mounted in the plate 74. The commutator 124 is fixedly mounted adjacent the end of shaft 62 by a setscrew 126.

From the foregoing, it should be apparent that when motor 104 is energized, the rotation of shaft 116 and pinion gear 114 drives pinion gear 118 and shaft 62. This in turn results in the rotation of shaft 32 and hence cell mount 30. The commutator 124 is simultaneously rotated by shaft 62 on which it is mounted.

Figure 5:
FIG. 5 is an enlarged partial sectional view of the commutator brushes illustrated in FIG. 2 taken along the line 5—5.
Figure 4:
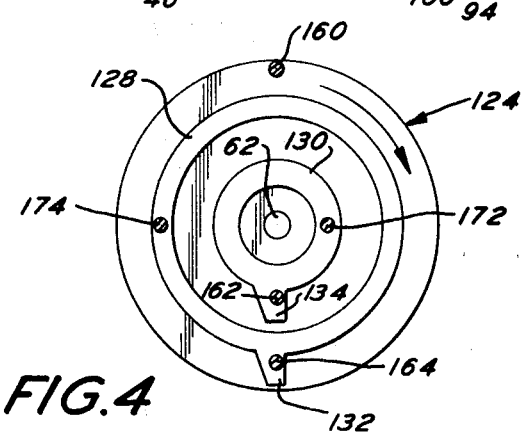
FIG. 4 is an enlarged top plan view of the commutator taken along the line 4—4 of FIG. 2.

As best shown in FIGS. 4 and 5, the commutator 124 is made of a nonconductive material, such as fiber or plastic. One surface of commutator 124 is provided with a pair of conductive tracks 128 and 130. The tracks 128 and 130 are concentric with the shaft 62 and may be formed by any well-known means, such as vacuum depositing copper or aluminum. The commutator 124 is mounted on shaft 62 with the tracks 128 and 130 adjacent plate 86. As shown in FIG. 4, the track 128 includes a generally radially extending contact 132 and the track 130 includes a similar contact 134. It should be noted that one side of the contacts 132 and 134 is at an angle to the radius. Thus, the contacts 132 and 134 are wider at the base where they join with tracks 128 and 130 than they are at their outer tip.

Figure 1:
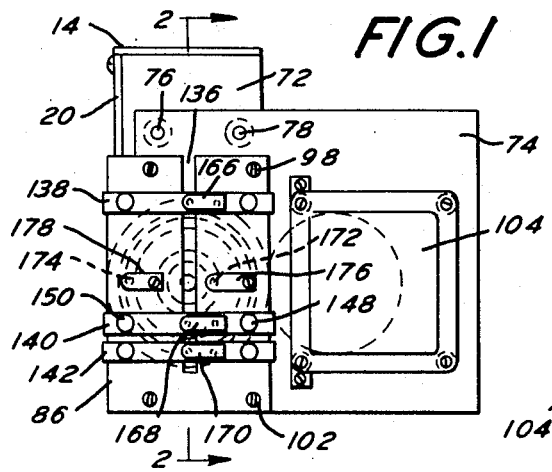
FIG. 1 is a side view of the cell-supporting apparatus and commutator for the spectrophotometer.
Figure 3:
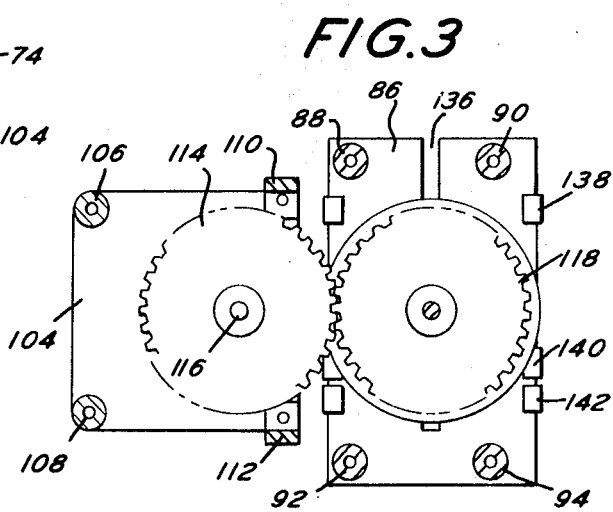
FIG. 3 is a sectional view of the apparatus shown in FIG. 2 taken along the line 3—3.

As shown in FIGS. 1 and 3, the commutator brush support plate 86 is bifurcated so as to form the longitudinal slot 136 equidistant the sides of the plate. Three adjustable brush mounts 138, 140 and 142 are slidably mounted on the commutator brush support plate 86. Since the adjustable brush mounts 138, 140 and 142 are similar, only the brush mount 140 shown in FIG. 5 will be described in detail. The mount 140 is provided with laterally and inwardly extending legs 146 and 148 depending from either end thereof. The legs 146 and 148 receive the side edges of commutator brush support plate 86 and slide therealong. A pair of screws 148 and 150 having knurled heads extend through the brush mount 40 in threaded engagement therewith. By tightening the screws 148 and 150 against the plate 86, the brush mount 140 can be fixed in position on the plate 86. Similar knurled screws 152, 154 and 156 and 158 serve to fix the position of adjustable brush mounts 138 and 142.

Free-sliding brushes 160, 162 and 164 extend through holes in the adjustable brush mounts 138, 140 and 142 as well as slot 136. The brushes 160, 162 and 164 are preferably cylindrical pins made of a conductive material, such as copper. Leaf springs 166, 168 and 170 are fixed at one end to the upper surface of mounts 138, 140 and 142 respectively. The free end of springs 166, 168 and 170 overlies the brushes 160, 162 and 164 and biases them against the commutator 124. The springs 166, 168 and 170 are made of an electrically conductive material and fixed to the mounts 138, 140 and 142 by means of rivets as shown in FIG. 5. A conductor may be soldered to the springs as shown.

A pair of free-sliding brushes 172 and 174 extend through holes in the commutator brush support plate 86. The brushes 172 and 174 are biased against the commutator 124 by leaf springs 176 and 178. The springs 176 and 178 are mounted on the surface of plate 86 by screws.

Referring to FIG. 4, it will be noted that the brushes 160 and 164 are biased against the commutator 124 at a position whereat they will slide against the contact 132 upon rotation of the commutator 124. The brush 164 is shown in position against the contact 132. The brush 162 is positioned so as to be biased against the contact 134. By loosening the screws holding the brush mounts 138, 140 and 142 in position, they can be moved along the plate 86 to thereby adjust the radial position at which the brushes 160, 164 and 162 will slide against the respective contacts 132 and 134. Since the contacts 132 and 134 are wider at the point where they join tracks 128 and 130, the amount of time the brushes 160, 162 and 164 remain in contact against their respective contacts can be adjusted, assuming that the commutator is rotating at a constant speed. It should be noted that the contact 132 slides against both the brushes 160 and 164. The brushes 172 and 174 continuously ride on the tracks 130 and 128 respectively. As will be made clear hereinafter, the brushes 172 and 174 may be referred to as common contacts.

Figure 7:
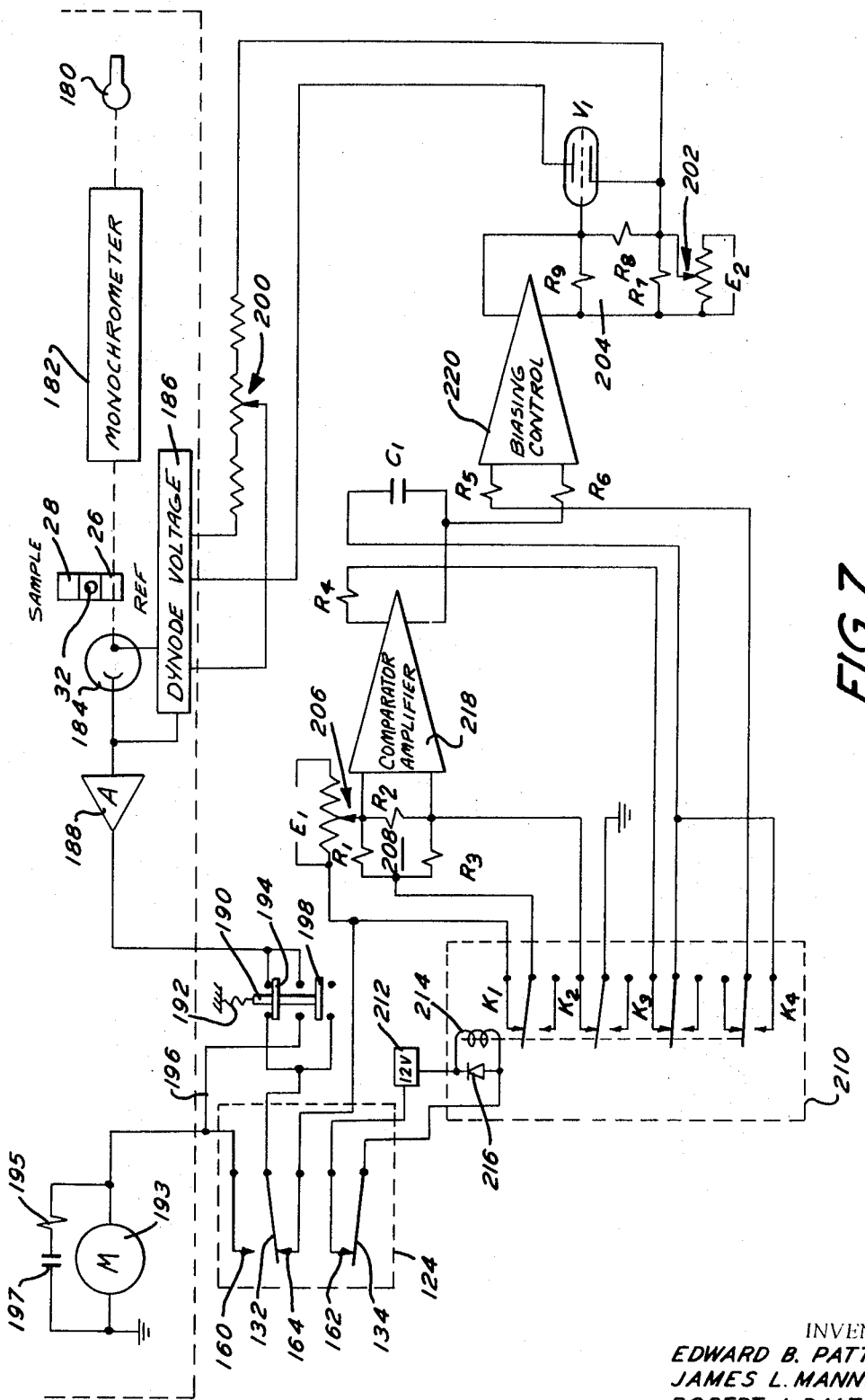
FIG. 7 is a schematic diagram illustrating the spectrophotometer and a circuit for controlling the dynode voltage on a photomultiplier tube.

Referring now to FIG. 7, the electrical circuitry for the apparatus heretofore described is illustrated.

The apparatus shown within the dotted line is a conventional spectrophotometer using a conventional photomultiplier. The only variation is that the rotatable sample cell 28 and reference cell 26 have been placed in the optical path from the monochrometer to the photomultiplier. The cell mount 30 is positioned so that electromagnetic energy from the monochrometer will alternately pass through the reference and sample cells as they are rotated.

The spectrophotometer includes a source of electromagnetic energy 180 and a monochrometer 182. Electromagnetic energy passing through either the sample or reference cells is detected by a photomultiplier 184 which includes a dynode voltage supply 186. The output of photomultiplier 184 is amplified by voltage amplifier 188. The amplifier 188 is a conventional amplifier used with the photomultipliers for spectrophotometers to amplify the photomultiplier output. The output of amplifier 188 is connected by set-reference switch 190 to the meter 193. The switch 190 includes a biasing spring 192. Meter 193 is connected to ground and in parallel with a resistance 195 and capacitance 197. The resistance 195 and capacitance 197 provide a conventional damping circuit for the meter 193. The meter 193 is a conventional meter used in spectrophotometry calibrated to read in terms of percentage of transmission relative to the transmission through the reference cell. The transmission through the reference cell is adjusted to 100 percent. Those skilled in the art will recognize that a recorder, such as a strip chart recorder, or other conventional readout means can be substituted for the meter 193.

The description of the remainder of the circuit illustrated in FIG. 7 will be incorporated with a description of its function.

To begin operation of the apparatus, a reference cell 26 and sample cell 28 are inserted in the holder 30. The holder 30 is rotated to the position shown wherein the reference cell 26 is in line with the optical path of the monochrometer 182. This places the brush 162 against the contact 134 and the brush 164 against the contact 132. With the apparatus thus aligned, the electromagnetic source 180 is energized and the output thereof permitted to pass through the monochrometer 182, the reference cell 26 and impinge upon the cathode of the photomultiplier 184.

The set-reference switch 190 is now depressed against the bias of spring 192 so that its contact 194 connects the output of amplifier 188 to the meter 193 through the conductor 196. The potentiometer 200, which controls the dynode voltage 186, is adjusted to bring the reading on meter 193 to approximately 100 percent. In a preferred embodiment, the meter 193 will read 100 percent when the output of amplifier 188 is 1 volt. The potentiometer 200 represents a means to roughly adjust the meter 193 to 100 percent. Fine adjustment is accomplished by adjusting the potentiometer 202 which is energized by the voltage $E_2$. The output voltage of potentiometer 202 is applied across the resistance bridge 204 which includes resistances $R_7$, $R_8$ and $R_9$. The voltage across resistance $R_8$ controls the bias of the grid of triode $V_1$. The plate voltage for triode $V_1$ is derived from the dynode voltage supply 186. By adjusting potentiometer 202, the plate voltage of triode $V_1$ can be controlled and therefore the dynode voltage for photomultiplier 184. Accordingly, fine control over the output of photomultiplier 184 is provided. The potentiometer 202 is adjusted until the meter 193 reads precisely at 100 percent transmission through reference cell 26.

With the set-reference switch 190 in the set position, contact 198 completes a circuit from amplifier 188 through common brush 174, common track 128, contact 132, brush 164 to potentiometer 206. The commutator and its associated brushes have been represented schematically in FIG. 7. The contact 132 which switches electrical connection between brushes 160 and 164 have been represented as a swinging arm. The contact 134 has been similarly represented. The brushes 160, 162 and 164 are represented as switch contacts. The common tracks 128 and 130 as well as their associated brushes 172 and 174 are not shown. However, it will be readily recognized that the common tracks and their associated brushes would complete the circuit.

A voltage $E_1$ is applied to the potentiometer 206. The output voltage of potentiometer 206 represents a comparator reference voltage which is applied through the bridge 208. Bridge 208 includes resistances $R_1$, $R_2$ and $R_3$. The voltage from amplifier 188 is applied to bridge 208 through contact $K_1$ on relay 210. Thus, the output of amplifier 188 is connected to resistance $R_3$ and then to ground through the contact $K_2$ of relay 210.

The comparator reference voltage derived from potentiometer 206 is applied to resistor $R_1$. In the manufactured embodiment of this invention, the voltage derived from potentiometer 206 is preadjusted by the manufacturer and the operator of the monochrometer does not make any further adjustments of potentiometer 206. The relay 210 is illustrated in its energized position. Energization power for the relay is derived from a 12-volt source 212 applied through the brush 162 and contact 134 to the relay coil 214. A diode 216 is connected across the coil 214 to prevent surge currents and contact arcing.

When the output of amplifier 188 has been properly adjusted by means of the dynode fine control potentiometer 202, the meter 193 will read 100 percent and the voltage across resistance $R_3$ will equal the voltage across resistance $R_1$ as derived from the potentiometer 206. Accordingly, the bridge is balanced and no voltage appears across resistance $R_2$.

A comparator amplifier 218 is connected across resistance $R_2$ so as to amplify any voltage that may appear at its input. The output of comparator amplifier 128 is connected in series with resistance $R_4$ which is connected through relay contact $K_3$ to one terminal of capacitor $C_1$. The other terminal of capacitor $C_1$ is connected to the opposite side of amplifier 218 and to resistance $R_6$ which is connected to one side of biasing control amplifier 220. The other side of biasing control amplifier 220 is connected to resistance $R_5$ and one of the open contacts of relay 210.

As heretofore explained, the adjustment of meter 100 to read 100 percent transmission simultaneously applies a voltage across resistance $R_3$ which is equal to the comparator voltage across resistance $R_1$. Bridge 208 is therefore balanced and no voltage appears across resistance $R_2$ and the output of comparator amplifier 218 must be zero. With no output from comparator amplifier 218, there can be no input into biasing amplifier 220. The voltage $E_2$ provides the necessary bias across resistance $R_8$ and the grid of triode $V_1$ to adjust the meter 193 to 100 percent.

The set-reference switch 190 is now returned to the reference position illustrated in FIG. 7. The motor 104 is turned on and the cell holder is rotated so as to alternately move the sample cell and then the reference cell into the optical path between the monochrometer 182 and the photomultiplier 184. For purposes of further discussion, it will be assumed that the holder 30 has been rotated to a position where the reference cell is in the optical path. It is to be further assumed that for some reason the output of photomultiplier 184 has changed so that the output of amplifier 188 is no longer 1 volt and the meter 193 would not read 100 percent if connected through the amplifier 188. Such a change may be the result of a variation in the output of source 180. It may also be the result of a purposeful change in the effect of monochrometer 182 on the source electromagnetic radiation. For example, the operator may be purposely varying the frequency of electromagnetic radiation passing through the reference cell.

When the reference cell is positioned in the optical path, the commutator 124 will connect the output of amplifier 188 through the contact 132 to the brush 164. Brush 164 is connected through relay contact $K_1$ to resistor $R_3$. Therefore, the change in the output voltage of amplifier 188 will appear as a voltage change across resistor $R_3$. The new voltage across $R_3$ will differ from preset the voltage across $R_1$ and a voltage difference will therefore appear across resistor $R_2$.

The voltage difference across resistor $R_2$ is detected by comparator amplifier 218 and applied through resistance $R_4$, relay contact $K_3$ to capacitor $C_1$. The other terminal of capacitor $C_1$ is connected to comparator amplifier 218 and resistance $R_6$. Relay contact $K_4$ is open. Therefore capacitor $C_1$ is charged by the output of amplifier 218 and retains that charge.

The commutator 124 as well as the cell holder 30 will continue to rotate thereby bringing the reference cell out of the optical path and disconnecting the brush 164 from the contact 132 and the brush 162 from the contact 134. With the brushes thus disconnected and in midposition before contact 132 makes connection with brush 160, relay 210 will assume its normally open position because coil 214 is no longer energized. With relay 210 in the normally open position, relay contacts $K_1$, $K_2$ and $K_3$ are disconnected from the circuit. Contact $K_4$, now connects capacitor $C_1$ to resistor $R_5$. Thus, the capacitor $C_1$ is in parallel with resistances $R_5$ and $R_6$. It therefore discharges through biasing control amplifier 220. The voltage to which capacitor $C_1$ had previously been charged is proportional to the voltage across resistor $R_2$. This voltage in turn is proportional to the change in the output voltage of amplifier 188. Accordingly, the voltage on capacitor $C_1$ can be referred to as an error signal.

The biasing amplifier 220 applies the error signal to resistance $R_9$ in bridge 204. This change in voltage on resistance $R_9$ effects a change in the voltage across resistance $R_8$ and hence the voltage on the grid on triode $V_1$. The plate voltage of triode $V_1$ therefore varies and adjusts the dynode voltage 186. The change in dynode voltage corrects the output of photomultiplier 184 so that the output of amplifier 188 is again 1 volt. Therefore the meter 193 would read 100 percent if it were connected in the circuit.

The motor 104 continues to rotate the commutator 124 and cell holder 30 bringing the sample cell 28 into the optical path. When sample cell 28 is positioned correctly, brush 160 will be connected to contact 132. Accordingly, the output of amplifier 188 is applied through the set-reference switch 190 to the meter 193. The dynode voltage of course still reflects the adjustment made in the dynode voltage. The value read on meter 193 is therefore measured against a reference, the value of which has been automatically adjusted to 100 percent.

The meter 193 may be of the type that retains the reading thereon for a sufficient length of time to permit the operator to record the registered value. Because of the automatic adjustment, the operator will be able to directly read the meter in absolute percentage terms based on 100.

The motor continues to rotate thereby breaking the connection between contact 132 and brush 160 again making the connection illustrated in FIG. 7. The reference adjustment thereby repeats.

The position of brushes 160, 162 and 164 can be adjusted by means of their respective mounts 138, 140 and 142 to correct the length of time they are in contact with contact 132. Contacts 132 and 134 are positioned so that their leading edges (those at an angle to the radius) make contact with brushes 160, 162 and 164 only when the reference cell 26 and sample cell 28 are precisely aligned with the optical path from monochrometer 182 to photomultiplier 184. This assures that the electromagnetic radiation detected by photomultiplier 184 is only that radiation which is passing directly through the sample and reference cell. The light passed through the sample and reference cell will be normal to the wall of the cells. Thus, there will be a minimum of variation due to an increase in the length of the optical path through the cells or due to skewing thereof. This will also avoid possible internal reflections and diffusion.

The motor 104 can be adapted to not only rotate continuously but also it can be a stepping motor for rotating the cells step by step. Moreover, the motor 104 can be adapted to rotate the cells at various speeds. When using a stepping motor, circuitry can be provided to stop the motor at the "set" position of the cells, rotate the cells 180° to the "reference" position and stop, and then rotate the cells 180° back to the "set" position.

The present invention may be embodied in other specific forms without departing from the spirit or essential attributes thereof and, accordingly, reference should be made to the appended claims, rather than to the foregoing specification as indicating the scope of the invention.

We claim:

1. A spectrophotometer, a source of electromagnetic radiation, radiation sensing means, support means for a sample cell and a reference cell, drive means for alternately rotating said sample cell and reference cell into alignment with an optical path between said source of electromagnetic radiation and radiation sensing means, and switch means cooperating with the rotation of said support means for said sample cell and reference cell to switch the output of said radiation-sensing means in accordance with the rotative position of said sample cell and reference cell relative to said optical path, said switching means including a commutator having first and second conductive tracks thereon, a first bulbous portion extending laterally outward from the first conductive track, a second bulbous portion extending laterally outward from the second conductive track, a first electrically conductive brush means mounted for contact with only said first bulbous portion, a second electrically conductive brush means mounted for contact with only said second bulbous portion, and a third electrically conductive brush means mounted for contact with only said second bulbous portion, means for rotating the commutator and brush means relative to each other, said second brush means being spaced from the first brush means for contact with said second bulbous portion when said commutator is rotated so that said first brush means is out of contact with said first bulbous portion, said third brush means being spaced from said first brush means for contact with said second bulbous portion when said commutator is rotated so that said first brush means is in contact with said first bulbous portion, each said bulbous portion having a leading edge which is at an angle to a radial measured from the center of rotation of said commutator, means for adjusting the position of said first, second and third brush means relative to said commutator, whereby the time at which each said brush means makes contact with their respective bulbous portions may be varied.

2. In a spectrophotometer in accordance with claim 1 wherein said switch means includes means for connecting said radiation-sensing means to a measuring means through said second bulbous portion and said second brush means when said sample cell is aligned with said optical path, said switch means including means for connecting said radiation-sensing means to a control means through said second bulbous portion and said third brush means for controlling the sensitivity of said radiation-sensing means when said reference cell is aligned with said optical path, said control means including means for maintaining said radiation-sensing means at a predetermined sensitivity, said means for maintaining said radiation-sensing means at a predetermined sensitivity including a bridge circuit for comparing a preset value with an instantaneous value.